United States Patent [19]

Goodfellow

[11] Patent Number: 6,058,604
[45] Date of Patent: May 9, 2000

[54] CABLE FOR ALLOWING MASS STORAGE DEVICE ADDRESS SELECTION

[76] Inventor: Tony Goodfellow, 6662 Gatehill Cir., Huntington Beach, Calif. 92648

[21] Appl. No.: 08/971,227

[22] Filed: Nov. 15, 1997

[51] Int. Cl.[7] .................................................. H01R 43/16
[52] U.S. Cl. ............................... 29/874; 29/747; 29/748; 29/749; 29/750; 29/865; 29/866; 29/884; 439/49; 439/119; 439/329; 439/346; 439/391; 439/426; 439/494
[58] Field of Search ............................. 29/749, 747, 865, 29/748, 866, 750, 867, 874, 884; 439/49, 50, 52, 53, 77, 95, 96, 98, 99, 119, 329, 346, 389, 391, 426, 494

[56] References Cited

U.S. PATENT DOCUMENTS

| | | | |
|---|---|---|---|
| 4,850,899 | 7/1989 | Maynard | 439/628 |
| 5,326,286 | 7/1994 | Bixler et al. | 439/751 X |
| 5,465,479 | 11/1995 | Bowen et al. | 29/749 X |
| 5,601,444 | 2/1997 | Cox | 439/299 X |
| 5,794,014 | 8/1998 | Shetty et al. | 395/500 |
| 5,805,921 | 9/1998 | Kikinis et al. | 395/822 |
| 5,905,885 | 5/1999 | Richter et al. | 395/500 X |

OTHER PUBLICATIONS

Application, pp. 1–5 Tony Goodfellow, Cable Construction Method to Allow Mass Storage Device Address Selection by Means of its Position on a Cable, Nov. 15, 1997.

*Primary Examiner*—Lee Young
*Assistant Examiner*—Binh-An Nguyen
*Attorney, Agent, or Firm*—Christie, Parker & Hale, LLP

[57] ABSTRACT

A cable constructed with insulation displacement connectors produces cables which connect data storage devices to a host system. The cable allows automatic address selection of data storage devices depending on the presence or absence of a CSEL terminal pin on a corresponding connector and the location of a data storage device along the cable. Address selection by connector configuration simplifies cable construction. The end connector of an ATA cable is configured to identify an attached data storage device as the first device (drive 0), while an intermediate connector is configured to identify an attached data storage device as the second drive (drive 1), thus making installation more intuitive.

7 Claims, 2 Drawing Sheets

CABLE FOR ALLOWING MASS STORAGE DEVICE ADDRESS SELECTION

FIELD OF THE INVENTION

This invention relates to the connection of storage and other devices to computer systems.

BACKGROUND OF THE INVENTION

One of the most popular types of storage devices used on computer systems of all types is termed an IDE or ATA device. The name derives from the interface standard used by the device to connect to the computer system. The standard is recognized on an industry wide basis and is administered under the auspices of the American National Standards Institute (ANSI). By following this standard, computer systems computer users can obtain devices from a variety of manufactures and know that they will inter-operate.

Devices are typically connected to the computer (host) using a flat ribbon cable. The cable has one end connected to the host and the other to a device. Up to two devices may be connected to the cable, one at the other end to the host and the second at an intermediate position. In a two-device configuration, both of them share all the wires on the cable and there has to be a definitive way for the host to be able to address one or the other device. This is achieved by setting switches or "jumper blocks" on the drives.

The configuration of this causes numerous problems for the end user and the system manufacturer who supplies the computer. The bulk of these devices are used on "Personal Computers" (PCs) where it is not reasonable to expect the average user to be an expert. In the early days of PCs, the only storage devices were floppy disks. A standard was set that was easy to understand. The first drive addressed was at the end of the cable and the second was in the middle. It did not take too much expertise to understand this rule. Unfortunately, this did not extend to the hard drive, because where the hard drive is on the cable does not determine which drive is addressed first. This leads to great confusion to the user and costs the industry vast amounts in support costs explaining how to actually configure the drives.

The ANSI standard includes definitions of the number of wires used on the cable, what they are used for, the electrical characteristics, and the maximum length of the cable. One aspect of this specification is signal quality and the location of drives on the cable. For a single drive configuration, it is important for that drive to be on the opposite end of the cable to the host. This reduces the electrical noise associated with ringing. This means that for a one-drive configuration, the drive should be at the end of the cable opposite the host.

In an attempt to solve the drive address problem, the ANSI standard (ATA-2) defines the use of a signal on the cable termed Cable Select (CSEL). CSEL works by assigning one pin on the interface to be used by the drive to determine if it is the first or second drive on the cable. This is achieved by one of the connectors in the cable having this pin tied to ground and the other end open. A simple circuit consists of a pull-up resistor on this signal on every drive. The drive attached to the connector, which is tied to ground, will see a low signal, while the other will see a high signal. The standard defines that the device seeing the low signal is the first device; the other is the second. The standard currently defines this signal to be conductor 28 in the cable. The simplest way for this to be described is for the conductor 28 to be connected via pin 28 (CSEL pin) at the host to ground. This conductor is then connected to pin 28 at the intermediate connector and signals to a drive attached to that connector that it is the first drive. The conductor is cut between the intermediate connector and the drive end connector. This leaves the signal not grounded and signals to the device that it is the second device.

This is counter to the requirements for good electrical characteristics on the cable. It is also not the accepted use of drives on the cable. If there is only one drive on the cable, it is usual and good electrical practice to place it at the end of the cable. Because the drive is on the end of the cable and the CSEL pin is not grounded, the drive will respond as though it is the second drive on the cable. Even though the drive is responding to the second address, the host system will work out that only one drive exists. Consequently, the host system logically addresses the drive as the first drive in the system. All the data stored on that drive would be addressed by the host operating system as though it is the first drive. This works until the user adds a second drive. This second drive would be added to the spare connector located between the two ends. This is a natural and logical action taken by the user. Now the system sees two drives; the new drive responds to the first address and the original drive still responds to the second address. The system operating system now maps its logical first drive to the new drive and creates a new reference to the original drive since it now sees it as a second device. All the user software is now addressing the wrong drives which, at best, causes confusion and, at worst, causes data to be incorrectly written and corrupted.

In addition to causing even more confusion, the manufacture of the CSEL cable as defined in the current standard (termed ATA-2) is not trivial. To cut a conductor cleanly in mass production, leaving no ends to unravel or rough ends to electrically short, is not easy.

SUMMARY OF THE INVENTION

In one aspect of the invention, a multi-conductor ribbon cable is coupled to a host adapter at a first end and to one or more peripheral data storage devices at a second end. The host adapter applies ground potential (0V) to pin 28 of its corresponding connector. Peripheral data storage devices are connected to the cable by insulation displacement connectors. An insulation displacement connector at the distal end of the cable has a terminal pin included in the pin 28 position, which makes contact with the corresponding conductor to thereby reflect ground potential at that pin. An intermediate connector disposed along the length of the cable has a terminal pin omitted from the pin 28 position, thus showing an open circuit to any apparatus sensing pin 28 at that connector. A peripheral data storage device coupled to the distal connector will therefore identify itself as the first drive (drive 0). A peripheral data storage device coupled to the intermediate connector will therefore identify itself as the second drive (drive 1).

DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

Figure 1:
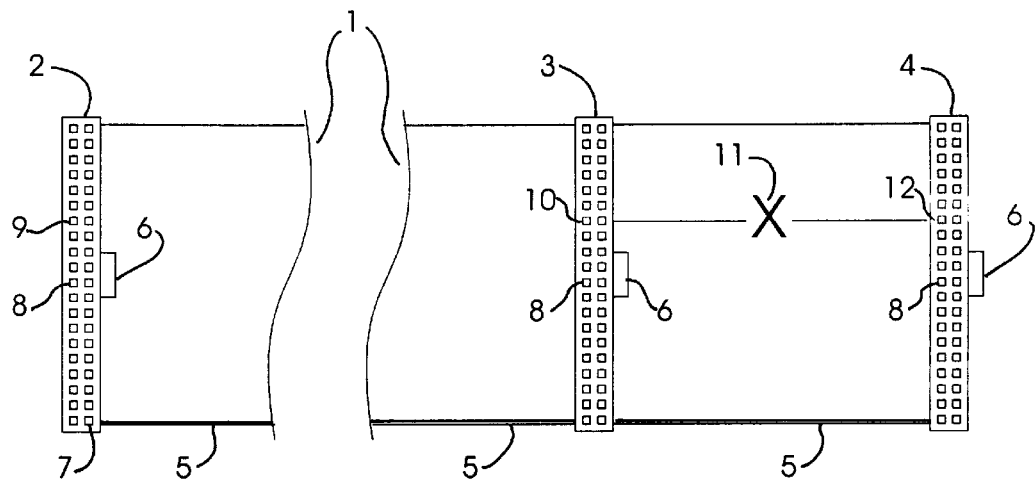
FIG. 1 is a simplified, semi-schematic diagram of an ATA cable constructed in accordance with the prior art.

FIG. 1 depicts a conventional 40 conductor, industry standard 0.050 inch pitch flat ribbon cable 1 suitable for connecting disk drives to a host computer system and promoting communication in accordance with the IDE protocol. The cable 1 includes a 40 pin standard insulation displacement connector (IDC) socket 2 adapted for connecting the cable to a host adapter. In addition, the cable 1 includes a 40 pin standard insulation displacement connector (IDC) socket 3 disposed along the length of the cable 1 and adapted for connection to an intermediate drive. A further 40 pin standard insulation displacement connector (IDC) socket 4 is disposed on the end of the cable opposite the adapter socket 2 and adapted for connection to a drive at the distal end of the cable. In accordance with convention, an edge conductor 5 typically connected to pin 1 of each of the connectors (2, 3, and 4) is optionally marked with a color in order to aid identification and maintain proper orientation of the cable. Further, the IDC connectors (2, 3, and 4) are commonly constructed to include a polarizing lug 6 that mates with a corresponding shroud of a mating connector in order to prevent reverse insertion.

The pin receptacles are disposed in two parallel rows, with the location of the pin 1 socket being at the cable pin 1 end of the forward row, as indicated in FIG. 1 at 7. Also, as a further aid to proper insertion, the pin 20 receptacle (socket) is plugged in each connector as indicated in FIG. 1 at 8. Likewise, the mating connectors are constructed with pin 20 removed so as to accommodate the plugged pin 20 receptacle of the connectors. This is commonly done in order to prevent reverse insertion of the cable.

For proper operation of the CSEL function, the cable conductor corresponding to pin 28 must be connected to ground potential (0V) in order to provide the proper signal level at the various disk drives connected to the cable. Accordingly, pin 28 is coupled to ground potential at the host adapter, with ground being thus provided to the appropriate conductor 9 corresponding to pin 28 of the cable.

The intermediate IDC connector 3, which connects to an intermediate drive, has an active connection to the 28th conductor 9 via a respective pin 28 connection 10. Accordingly, a drive connected to the intermediate connector 3 will sense the voltage level at pin 28 as 0V and will thus be designated as drive 0 (the first drive). According to practice of the prior art, the 28th conductor 9 is cut (open circuited) 11 in a location between the intermediate connector 3 and the drive end connector 4 of the cable. Thus, the drive end connector's pin 28 socket 12 is not connected to ground, and any disk drive coupled to this connector will have its respective pin 28 pulled up by its internal pull-up resistor to the supply rail potential. The drive will accordingly be designated drive 1 (the second drive).

In other words, the prior art contemplates tying pin 28 of the intermediate connector to ground potential (0V) and allowing a disk drive on the distal end of the cable to pull pin 28 up to a supply potential by leaving pin 28 unconnected (open circuited) on the drive end connector. Since drives includes an internal pull-up resistor which couples their respective pin 28 to the drive's internal voltage rail ($V_r$), when pin 28 is not connected to ground potential, the pin is pulled up to $V_r$ volts. As a drive senses this voltage, voltage sense circuitry typically disposed within each drive identifies the drive as drive 1. When a drive's pin 28 is coupled to ground potential, the voltage at pin 28 is essentially zero volts, indicating that the drive is drive 0.

This arrangement was initially contemplated in order to make it easy for computer users to number their drives according to the location that they are placed along the cable. Unfortunately, the CSEL method is considered unacceptable for a number of reasons. In particular, the drive position numbering reverses the numbering convention that a user is used to accepting, i.e., the first drive is expected to be on the end of the cable. Further, it is electrically unsound to connect a drive in the intermediate position, leaving the cable stub unterminated by not providing a second drive in the end position. In addition, cable construction is difficult. Cutting the cable at an intermediate position causes problems of frayed ends and possible cable misalignment. Some host systems are able to operate with only one drive positioned on the end of the cable. These systems recognize that drive 0 (the intermediate connector position) is missing and renumber the physical drive 1 to be drive 0. However, when a user later adds a second drive in the intermediate position, the second drive automatically defaults to become drive 0, and the original drive is redesignated drive 1. Because of drive renumbering, the host system loses track of the data on the original drive. This causes operational difficulties and data loss.

In accordance with practice of principals of the present invention, a cable construction technique is described that allows the CSEL signal (conductor 28) to be tied to ground potential at the end of the cable and register as an open circuit at the intermediate position. This cable construction technique does not require conductor 28 to be cut at any position in order to ease the construction process. In accordance with the invention, an insulation displacement connector (IDC) header is provided with the insulation displacement terminal removed at the conductor 28 position. This particular IDC connector is coupled to a standard 40 conductor ribbon cable at the intermediate position. Thus, a disk drive coupled to the intermediate connector will not sense ground potential at pin 28 and thus allow its pin 28 to be pulled up to the supply rail ($V_r$) indicating that the drive in the intermediate position is drive 1 (the second drive). Further, and in accordance with the present invention, a standard IDC connector is disposed at the distal end position of the cable and includes an insulation displacement terminal at its pin 28 (conductor 28) position. Thus, a disk drive coupled to the end connector will sense ground potential (0V) at its pin 28, indicating that this drive is drive 0 (the first drive).

Accordingly, the invention achieves the desired result, with the drive at the end of the cable designated as drive 0 and the drive in the intermediate position along the cable designated as drive 1. Construction of such cable is simplified considerably, and obviates the need of cutting a conductor, as well as eliminating the problems associated therewith. For ease of construction and assembly, the intermediate IDC connector might be color coded, but this is not a requirement of the invention.

Figure 2:
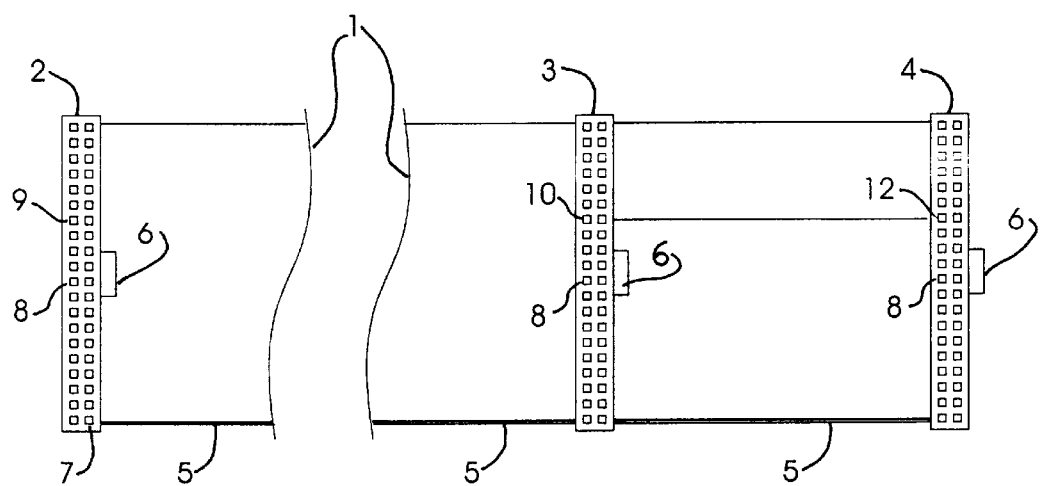
FIG. 2 is a simplified, semi-schematic diagram of an ATA cable constructed in accordance with principals of the present invention.

FIG. 2 is a semi-schematic illustration of an ATA cable constructed in accordance with the present invention. Since the cable of FIG. 2 shares many features in common with the prior art cable of FIG. 1, common elements will be designated with the same reference numeral. In particular, the cable 1 is an industry standard 40 conductor 0.050 inch ribbon cable. The cable 1 includes a 40 pin standard insulation displacement connector (IDC) socket 2 for connecting the cable to a host adapter. A 40 pin insulation displacement connector (IDC) socket 3, having its pin 28 terminal removed according to the invention, is disposed in an intermediate position along the cable and used for connection to an intermediate position disk drive. An additional 40 pin insulation displacement connector (IDC) socket 4 is disposed at the distal end of the cable and is used for connection to a respectively positioned disk drive. As was the case in the prior art cable of FIG. 1, the conductor corresponding to pin 1 of the various connectors is marked with a color to aid in identification and orientation. Further, the IDC connectors (2, 3, and 4 of FIG. 2) each include a polarizing lug that mates with the corresponding shroud of a mating connector in order to prevent reverse insertion. Pin 1 of each connector is in the same position as in the prior art case, with pin 1 being located at the end of the forward row of receptacles as indicated in FIG. 2 at 7.

In order to further prevent reverse insertion of the cable and to ensure compatibility between cables of the present invention and cables of the prior art, each connector has its pin 20 receptacle plugged (as indicated at 8 in FIG. 2). Likewise, mating connectors on the host adapter and disk drives have their pin 20 removed to accommodate the plugged pin 20 receptacle of each connector. For correct operation of CSEL, pin 28 of the host adapter is tied to a ground potential. The appropriate conductor of the host adapter connector 2, pin 28 indicated at 9, is therefore connected to ground. Since pin 28, indicated at 10, on the intermediate connector is missing, pin 28 on the intermediate connector 3 is thus not tied to ground. A disk drive connected to this connector will sense its pin 28 at $V_r$ and therefore designate the drive as drive 1 (the second drive).

In contrast to the prior art, the end connector 4 of the cable has its pin 28, indicated at 12, tied to ground potential. Thus, any drive coupled to this connector will sense 0V at its pin 28 and will be therefore designated drive 0 (the first drive).

Figure 3:
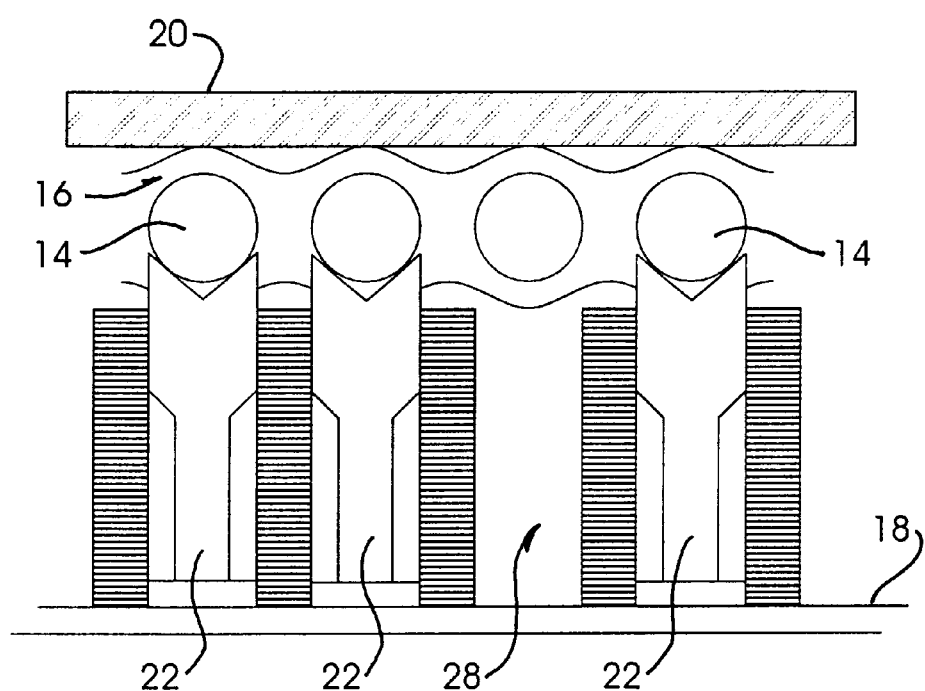
FIG. 3 is a simplified, semi-schematic cross-sectional diagram of a portion of an ATA cable disposed within an insulation displacement connector according to principals of the present invention.

FIG. 3 is a semi-schematic partial cross-sectional diagram illustrating the internal construction of an IDC header in combination with a portion of a 40 conductor ribbon cable, suitable for practice of principals of the present invention. As can be seen from the figure, a ribbon cable consists of parallel conducting wires 14 surrounded by flat ribbon insulating material 16. An IDC header has a base 18 which supports the cable material and a top clamp 20 which is snapped over the cable and which retains the cable against the base 18. The base 18 is constructed from insulating material and includes spaced-apart slots formed in the material into which terminal pins 22 are placed. Each terminal pin 22 is configured with a sharpened grooved end, which penetrates the cable's insulation material and makes intimate contact with a respective conductor, as the top clamp 20 and base 18 are pressed together over the cable.

In accordance with the invention, the slot in the connector base, into which a terminal pin corresponding to pin 28 is normally inserted, is left empty (no terminal pin is inserted), thereby allowing the corresponding conductor (conductor 28) to pass through the connector without making contact with a terminal pin. Accordingly, the corresponding pin 28 of the intermediate connector, constructed in accordance with the invention, will electrically correspond to an open circuit.

Cable construction in accordance with the present invention is thereby greatly simplified. The process of cutting a single wire, as in the prior art, is eliminated, resulting in a clean and easily reproduced product. The attachment of a single device at the end of the cable now means that it is both logically and physically addressed as the first device (drive 0). When a second device is added in the intermediate position, it is now both logically and physically addressed as the second device (drive 1). User confusion and system-related problems are thereby drastically reduced.

Although the present invention has been described in terms of a two-drive, two-connector system, it will be understood by those having skill in the art that it has a considerably wider utility. For example, the conductor width of a ribbon cable could be extended beyond 40 conductors in order to accommodate additional wires for address selection. As additional address selection wires are added, more disk drives may be coupled to the cable, and their logical and physical positions along the cable might be sensed by a binary code to define their position. If several wires were used for address selection, contacts in the various connectors according to the invention could be selectively removed in order to define a binary sequence, i.e., 0,0:0,1:1,0:1,1. Thus, using two wires for address selection, four drives could be selected. Three wires used for address selection would allow eight drives to be selected, and so forth.

While the invention has been described in terms of the illustrated embodiment, it will be evident to one having skill in the art that various modifications may be made to the illustrated and other embodiments of the invention described above, without departing from the broad inventive scope thereof. It will be understood, therefore, that the invention is not limited to the particular embodiments or arrangements disclosed but is, rather, intended to include any changes, adaptations, or modifications which are within the scope and spirit of the invention as defined by the appended claims.

What I claim is:

1. A method of constructing a ribbon cable of the type adapted to support ATA standard transmission protocols between a host computer and at least one peripheral apparatus, comprising:

providing a ribbon cable including an identification select conductor;

providing a first connector at a first end of the cable;

coupling the first connector to a host adapter;

providing a second connector along the length of the cable;

coupling the second connector to a peripheral apparatus; and contacting said identification select conductor with a contact pin of the second connector to provide a first identification select signal, the second connector providing a second identification select signal upon contacting said identification select conductor in the absence of a contact pin.

2. The method according to claim 1, further comprising:

providing a third connector at an end of the cable opposite peripheral apparatus; and wherein the second connector provides a first identification select signal upon the absence of a contact pin, and wherein the third connector provides a second identification select signal upon the presence of said contact pin.

3. The method according to claim 2, wherein the identification select conductor corresponds to pin 28, the host adapter providing a ground potential on a corresponding pin 28 of said first connector.

4. The method according to claim 3, wherein the second connector makes no contact with the identification select conductor by its corresponding pin 28, thus exhibiting an electrical open circuit on its pin 28.

5. The method according to claim 4, wherein the third connector makes contact with the identification select conductor by its corresponding pin 28, thus asserting ground potential on its corresponding pin 28 for receipt by a peripheral apparatus coupled thereto.

6. The method according to claim 5, wherein a peripheral apparatus coupled to the second connector senses the electrical open circuit on the second connector's pin 28, thus identifying itself as drive 1.

7. The method according to claim 6, wherein the peripheral apparatus coupled to the third connector senses ground potential on the third connector's pin 28, thus identifying itself as drive 0.

* * * * *